United States Patent
Clark et al.

(10) Patent No.: US 7,406,680 B1
(45) Date of Patent: Jul. 29, 2008

(54) METHOD FOR ADDING EXTENSIONS TO THE GRAMMAR FOR ASN.1 WITHOUT MODIFYING THE BASIC COMPILER AND CODE GENERATOR

(75) Inventors: Mark Clark, San Jose, CA (US); Mark Skrzynski, Capitola, CA (US); Florian Trinkwalder, Santa Clara, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 35 days.

(21) Appl. No.: 09/586,410

(22) Filed: Jun. 1, 2000

(51) Int. Cl.
*G06F 9/45* (2006.01)

(52) U.S. Cl. ............... 717/137; 717/140; 717/141; 717/143

(58) Field of Classification Search ............ 717/137, 717/140, 141, 143
See application file for complete search history.

(56) References Cited

U.S. PATENT DOCUMENTS

| | | | | | |
|---|---|---|---|---|---|
| 5,230,049 | A | * | 7/1993 | Chang et al. | 717/143 |
| 5,291,583 | A | * | 3/1994 | Bapat | 717/137 |
| 5,432,942 | A | * | 7/1995 | Trainer | 717/143 |
| 5,504,885 | A | * | 4/1996 | Alashqur | 717/141 |
| 5,640,550 | A | * | 6/1997 | Coker | 717/141 |
| 5,870,749 | A | * | 2/1999 | Adusumilli | 717/141 |
| 5,973,696 | A | * | 10/1999 | Agranat et al. | 709/203 |
| 6,063,133 | A | * | 5/2000 | Li et al. | 717/136 |
| 6,378,126 | B2 | * | 4/2002 | Tang | 717/143 |

* cited by examiner

*Primary Examiner*—Wei Y. Zhen
*Assistant Examiner*—Qamrun Nahar

(57) ABSTRACT

A processing system (100) implements a translator (102) and a compiler (106) for compiling a machine readable language. When a source file (104) is provided, the system performs a line-by-line compare to determine if the file contains extended grammar constructs (e.g., X.68x, where x is greater than or equal to 1) of the language, such as an ASN.1 standard language. If not, then the source file (104) is complied. If so, however, then the source file (104) is input to the translator (102) to translate into basic grammar constructs (e.g., X.680).

14 Claims, 3 Drawing Sheets

METHOD FOR ADDING EXTENSIONS TO THE GRAMMAR FOR ASN.1 WITHOUT MODIFYING THE BASIC COMPILER AND CODE GENERATOR

RESERVATION OF COPYRIGHT

A portion of the disclosure of this patent document contains material which is subject to copyright protection. The copyright owner has no objection to the facsimile reproduction by anyone of the patent document of the patent disclosure, as it appears in the Patent and Trademark Office patent file or records available to the public, but otherwise reserves all copyright rights whatsoever.

BACKGROUND OF THE INVENTION

1. Field of the Invention

The present invention relates to data coding and, in particular, to an improved method for compiling grammar extensions to data codes.

2. Description of the Related Art

The Abstract Syntax Notation One (ASN.1) is a notation for specifying data structures at a relatively high level of abstraction. In particular, ASN.1 defines a data structure protocol for describing messages to be exchanged between distributed computer systems. ASN.1 is used to generate programming language code that forms the core of a wide variety of massaging systems applications. For example, H.323 based systems use ASN.1 coded messages for signaling between H.323 endpoints, servers, gateways, and gatekeepers.

The ASN.1 language has evolved over time to include the ITU-T standards X.680 (Specification of Basic Notation), X.681 (Information Object Specifications), X.682 (Constraint Specification), and X.683 (Parameterization of ASN.1 Specifications), all of which are hereby incorporated by reference in their entireties as if fully set forth herein.

The basic ASN.1 compiler supports only X.680 grammar constructs. Typically, each extension has been supported through the development of an entirely new compiler. However, writing a compiler is relatively expensive and time consuming. Moreover, in certain instances, it is not possible because the code generated is proprietary. When new extensions of the grammar are defined, but the available compiler does not support them, the user cannot take advantage of the new features.

Typically, this has required the user to purchase a new compiler which, again, is relatively expensive. Alternatively, the user can manually convert the new grammar constructs into those that are supported by the old compiler.

SUMMARY OF THE INVENTION

These and other problems in the prior art are overcome in large part by a system and method according to the present invention. A computer system is provided including a software program that reads source files that contain extended grammar constructs of ASN.1 and generates a new file that is a translation of the input file without the extended constructs. The new file contains only the basic ASN.1 constructs. The new file may then be complied using a standard ASN.1 compiler.

A computer system according to an implementation of the invention implements a translator and a compiler for compiling a machine readable language. When a source file is provided, the system performs a line-by-line compare to determine if the file contains extended grammar constructs of the language. If not, then the source file is complied. If so, however, then the source file is input to the translator to translate into basic grammar constructs.

BRIEF DESCRIPTION OF THE DRAWINGS

A better understanding of the invention is obtained when the following detailed description is considered in conjunction with the following drawings in which.

DETAILED DESCRIPTION OF THE INVENTION

FIGS. 1-4 illustrate an improved system and method for compiling ASN.1 grammar constructs. A computer system is provided including a software program that reads source files that contain extended grammar constructs of ASN.1 and generates a new file that is a translation of the input file without the extended constructs. The new file contains only the basic ASN.1 constructs. The new file is then complied using a standard ASN.1 compiler.

Figure 1:
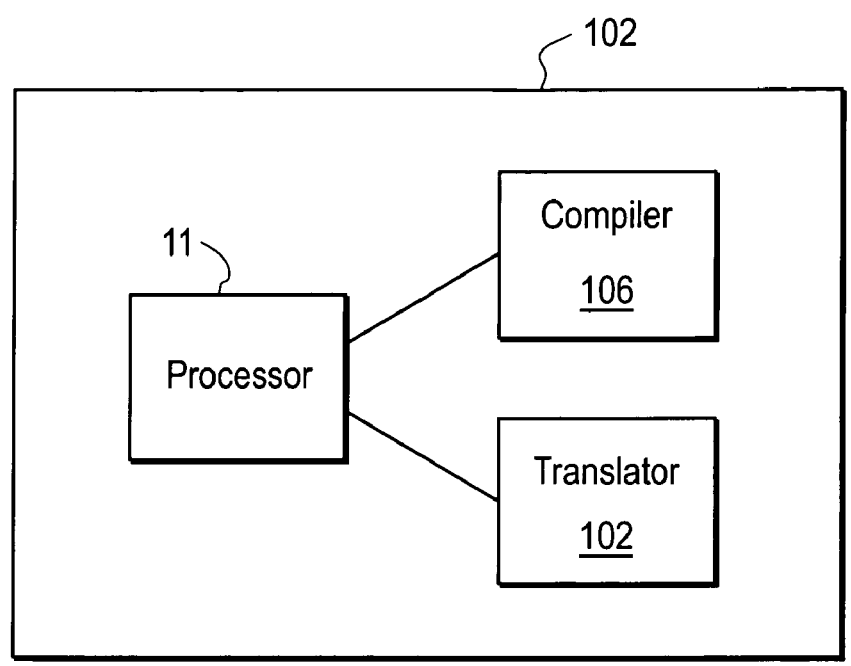
FIG. 1 is a diagram illustrating a system according to an implementation of the invention.

An exemplary processing system according to an implementation of the invention is shown in FIG. 1. As will be described in greater detail below, the system 102 may be embodied as an H.323 terminal or a general purpose computer system. In particular, the system may be embodied as a personal computer, such as an X86 compatible personal computer or an Apple Macintosh G4. The computer 102 includes a processor 11 adapted to implement computer code according to the present invention. As shown in the figure, a compiler 106 and a translator or precompiler 102 are resident.

Figure 2:
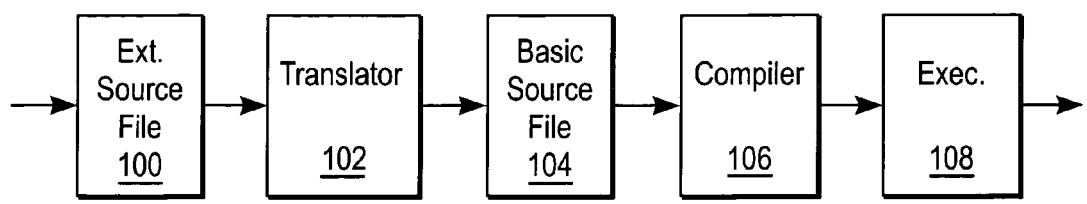
FIG. 2 is a diagram schematically illustrating operation of an embodiment of the invention.

Operation of an embodiment of the present invention is illustrated schematically with reference to FIG. 2. A source file 100 includes extended grammar constructs of ASN.1. Thus, the extended source file may include grammar constructs from X.68x (e.g., X.680, X.681, etc.). The extended source file 100 is input to the translator unit 102. The translator unit 102 may include one or more databases that store conversion tables of the extended and non-extended ASN.1 grammar constructs. The translator unit 102 outputs a basic source file 104. The basic source file 104 includes only grammar constructs supported by the basic compiler, such as only X.680 constructs. The basic source file 104 is input to the compiler unit 106. The compiler unit 106 may be any standard compiler that supports only the basic constructs. However, since the source file 100 has been translated into the source file 104, the compiler 106 is able to produce a complied executable file 108.

It is noted that the precompiler or translator 102 may be implemented having differing or even multiple configurable levels of precompilation. For example, the compiler 106 may support X.680 and X.681 constructs; in that case, the precompiler 102 need only implement X.682 and higher precompilation.

Figure 3:
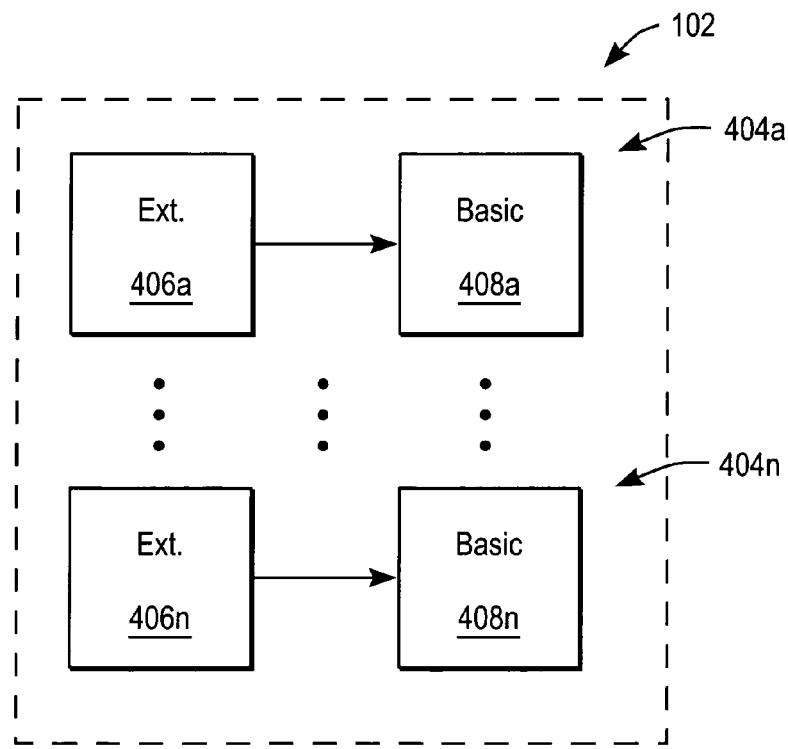
FIG. 3 is a diagram illustrating a translator according to an embodiment of the invention.

An exemplary translator or precompiler 102 is illustrated with reference to FIG. 3. As shown, the translator 102 includes a plurality of lookup tables 404a-404n. The lookup tables 404a-404n include entries for particular grammar extensions 406a-406n, and their corresponding basic grammar constructs 408*a*-408*n*. As will be explained in greater detail below, the translator 102 accesses the appropriate lookup table for the basic grammar constructs once the particular extension is identified.

Figure 4:
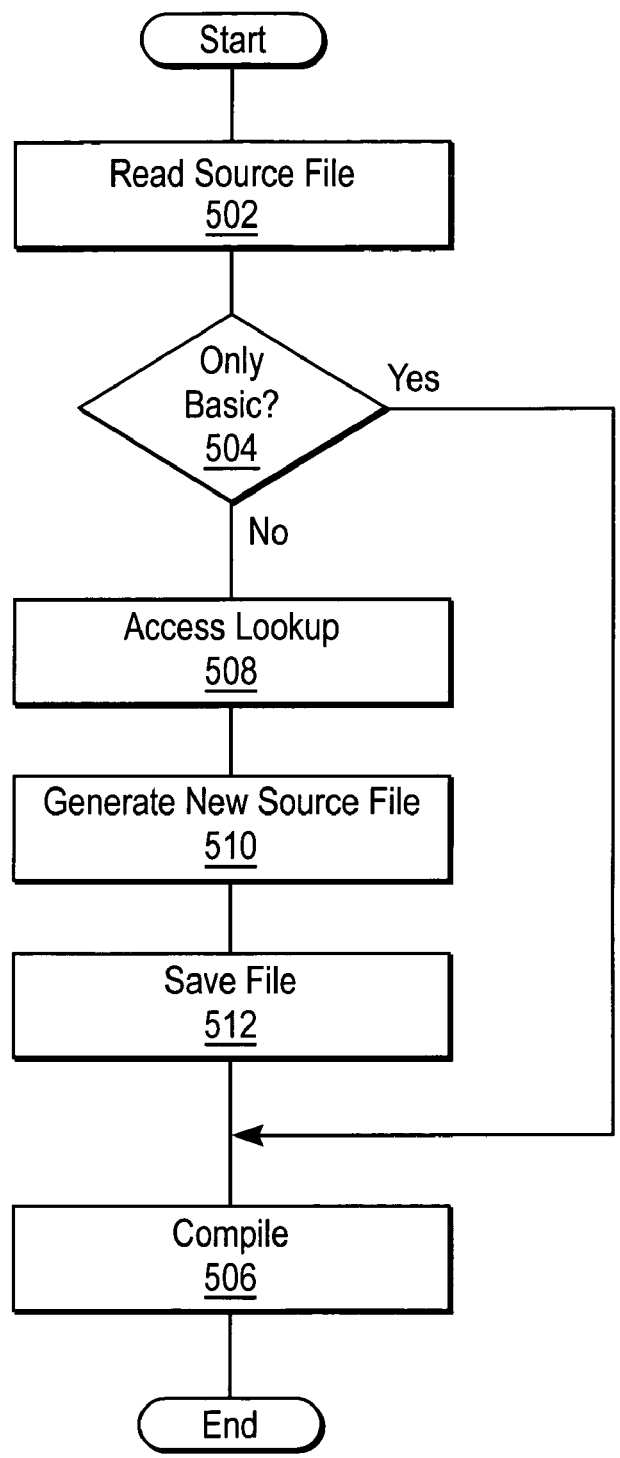
FIG. 4 is a flowchart illustrating operation of an embodiment of the invention.

In particular, FIG. 4 illustrates a flowchart according to a specific embodiment of the invention. In a step 502, the system reads a source file 100. In a step 504, the system determines whether the file contains the basic grammar or whether it also contains extended grammar constructs. For example, the system may access one or more of the lookup tables 404*a*-404*n* and make a line-by-line comparison of the source file to make this determination. If the file contains only basic grammar constructs, then in a step 506, the file 100 is complied using the compiler 106. Otherwise, in a step 508, the system accesses the lookup tables in the translator 102 and performs the appropriate translation of the grammar into the basic grammar constructs. In a step 510, the system generates the new basic source file, and may save the file to disk in a step 512. Finally, in step 506, the new source file is complied using the compiler 106.

The following examples illustrate files that are translated from extended grammar constructs to the basic grammar constructs only:

EXAMPLE 1

With Extensions

```
BEGIN
    SIGNED { ToBeSigned } ::= SEQUENCE
        toBeSigned      ToBeSigned,
        algorithmOID    OBJECT IDENTIFIER,
        signature       BIT STRING
    }
    H235CertificateSignature    ::=SEQUENCE
    {
        argument    Argument,
        signature   SIGNED { EncodedReturnSig },
        . . .
    }
    Argument ::= INTEGER
    EncodedReturnSig ::= NULL
        END -- of Test-ASN
```

Without Extensions

```
Test-ASN
DEFINITIONS AUTOMATIC TAGS ::=
BEGIN
H235CertificateSignature           ::=SEQUENCE
{
    argument   Argument,
    signature  SEQUENCE {
                  toBeSigned    EncodedReturnSig,
                  algorithmOID  OBJECT IDENTIFIER,
                  signature     BIT STRING
               },
    . . .
}
Argument ::= INTEGER
EncodedReturnSig ::= NULL
END    -- of Test-ASN
```

EXAMPLE 2

With Extensions

```
Test-ASN
    DEFINITIONS AUTOMATIC TAGS ::=
    BEGIN
        TESTOPERATION ::= CLASS
        {
            &arguments Arguments OPTIONAL
        }
        WITH SYNTAX
        {
            [ARGUMENTS          &arguments]
        }
        Arguments ::= CHOICE
        {
            argument1   INTEGER,
            argument2   INTEGER,
            argument3   INTEGER,
            argument4   INTEGER,
            argument5   INTEGER,
            argument6   INTEGER,
        }
        myTestOperation TESTOPERATION ::=
        {
            ARGUMENTS
        }
        TestOperationSet TESTOPERATION ::= {myTestOperation}
        myTest ::= SEQUENCE
        {
            arguments TESTOPERATION.&arguments
            ( { TestOperationSet } )
        }
    END -- of Test-ASN
```

Without Extensions

```
Test-ASN
    DEFINITIONS AUTOMATIC TAGS ::=
    BEGIN
        myTest ::= SEQUENCE
        {
        arguments Arguments
        }
        Arguments ::= CHOICE
        {
            argument1   INTEGER,
            argument2   INTEGER,
            argument3   INTEGER,
            argument4   INTEGER,
            argument5   INTEGER,
            argument6   INTEGER,
        }
    END -- of Test-ASN
```

The invention described in the above detailed description is not intended to be limited to the specific form set forth herein, but is intended to cover such alternatives, modifications and equivalents as can reasonably be included within the spirit and scope of the appended claims.

What is claimed is:

1. A system, comprising:
a translator on a computer executable medium adapted to translate between extended grammar constructs of a machine readable language and basic grammar constructs of said machine readable language, said machine readable language being ASN.1, wherein a translation comprises reading a source file containing extended grammar constructs, performing a lookup table conversion of said source file of extended grammar constructs into a basic source file containing only basic grammar constructs, said translator configured to implement one or more configurable levels of precompilation; and a compiler on a computer executable medium coupled to receive an output of said translator for compiling code written in said basic grammar constructs, wherein said compiler generates executable code implementing a function of the extended grammar constructs as complied basic grammar constructs;

wherein said translation comprises a direct conversion from said source file to said basic source file;

wherein said source file with extended grammar constructs is associated with basic executables;

wherein an exemplary file with extensions is in accordance with the following

---

```
Test-ASN
DEFINITIONS AUTOMATIC TAGS ::=
BEGIN
      TESTOPERATION ::= CLASS
      {
              &arguments Arguments OPTIONAL
      }
      WITH SYNTAX
      {
          [ARGUMENTS          &arguments]
      }
      Arguments ::= CHOICE
      {
              argument1   INTEGER,
              argument2   INTEGER,
              argument3   INTEGER,
              argument4   INTEGER,
              argument5   INTEGER,
              argument6   INTEGER,
      }
      myTestOperation TESTOPERATION ::=
      {
              ARGUMENTS
      }
      TestOperationSet TESTOPERATION ::= {myTestOperation}
      myTest ::= SEQUENCE
      {
          arguments TESTOPERATION.&arguments({TestOperationSet})
      }
END -- of Test-ASN;
```

--- and wherein an exemplary file without extensions is in accordance with the following

---

```
Test-ASN
DEFINITIONS AUTOMATIC TAGS ::=
BEGIN
      myTest ::= SEQUENCE
      {
      arguments Arguments
      }
          Arguments ::= CHOICE
          {
              argument1   INTEGER,
              argument2   INTEGER,
              argument3   INTEGER,
              argument4   INTEGER,
              argument5   INTEGER,
              argument6   INTEGER,
          }
      END - of Test-ASN.
```

---

2. A system in accordance with claim 1, said basic grammar constructs comprising X.680 grammar constructs.

3. A system in accordance with claim 2, said extended grammar constructs comprising at least one of X.681, X.682, or X.683 grammar constructs.

4. A system in accordance with claim 3, said translator comprising one or more lookup tables.

5. A method, comprising:

providing a first source file, said first source file including extended grammar constructs of a machine readable language;

translating said first source file into a second source file, said second source file containing only basic grammar constructs of said machine readable language, said machine readable language being ASN.1, wherein a translation comprises reading a source file containing extended grammar constructs, performing a lookup table conversion of said source file of extended grammar constructs into a basic source file containing only basic grammar constructs, said translating including selecting from multiple configurable levels of precompilation; and compiling said second source file using a compiler adapted to compile basic grammar constructs wherein said compiler generates executable code implementing a function of the extended grammar constructs as complied basic grammar constructs;

wherein said translation comprises a direct conversion from said source file to said basic source file;

wherein said source file with extended grammar constructs is associated with executables;

wherein an exemplary file with extensions is in accordance with the following

---

```
BEGIN
SIGNED { ToBeSigned } ::= SEQUENCE {
       toBeSigned         ToBeSigned,
       algorithmOID       OBJECT IDENTIFIER,
       signature          BIT STRING
}
H235CertificateSignature ::=SEQUENCE
{
       argument     Argument,
       signature    SIGNED { EncodedReturnSig },
       . . .
}
Argument ::= INTEGER
EncodedReturnSig ::= NULL
       END - of Test-ASN;
```

--- and wherein an exemplary file without extensions is in accordance with the following

---

```
Test-ASN
DEFINITIONS AUTOMATIC TAGS ::=
BEGIN
H235CertificateSignature ::=SEQUENCE
{
       argument   Argument,
       signature  SEQUENCE {
                  toBeSigned     EncodedReturnSig,
                  algorithmOID OBJECT IDENTIFIER,
                  signature    BIT STRING
                  },
       . . .
}
Argument ::= INTEGER
EncodedReturnSig ::= NULL
END -- of Test-ASN.
```

6. A method in accordance with claim 5, said first source file comprising at least one of X.681, X.682, or X.683 grammar constructs.

7. A method in accordance with claim 6, said second source file comprising X.680 grammar constructs.

8. A method in accordance with claim 7, said translating comprising accessing a lookup table for equivalent constructs.

9. A method comprising:
   providing a translator adapted to translate between extended grammar constructs of a machine readable language and basic grammar constructs of said machine readable language, said machine readable language being ASN.1, wherein a translation comprises reading a source file containing extended grammar constructs, performing a lookup table conversion of said source file of extended grammar constructs into a basic source file containing only basic grammar constructs, said translator configured to implement multiple configurable levels of precompilation; and
   providing a compiler coupled to receive an output of said translator for compiling code written in said basic grammar constructs wherein said compiler generates executable code implementing a function of the extended grammar constructs as complied basic grammar constructs;
   wherein said translation comprises a direct conversion from said source file to said basic source file;
   wherein said source file with extended grammar constructs is associated with basic executables;
   wherein an exemplary file with extensions is in accordance with the following

```
BEGIN
SIGNED { ToBeSigned } ::= SEQUENCE {
    toBeSigned      ToBeSigned,
    algorithmOID    OBJECT IDENTIFIER,
    signature       BIT STRING
}
H235CertificateSignature ::=SEQUENCE
{
    argument    Argument,
    signature   SIGNED { EncodedReturnSig },
    ...
}
Argument ::= INTEGER
EncodedReturnSig ::= NULL
        END - of Test-ASN;
``` and wherein an exemplary file without extensions is in accordance with the following

```
Test-ASN
DEFINITIONS AUTOMATIC TAGS ::=
BEGIN
H235CertificateSignature ::=SEQUENCE
{
    argument    Argument
    signature   SEQUENCE {
        toBeSigned      EncodedReturnSig,
        algorithmOID OBJECT IDENTIFIER,
        signature BIT STRING
    },
    ...
}
Argument ::= INTEGER
EncodedReturnSig ::= NULL
END -- of Test-ASN.
```

10. A method in accordance with claim 9, said basic grammar constructs comprising X.680 grammar constructs.

11. A method in accordance with claim 10, said extended grammar constructs comprising at least one of X.681, X.682, or X.683 grammar constructs.

12. A method in accordance with claim 11, said translator comprising one or more lookup tables.

13. A computer-readable computer program product, comprising:
   computer-readable program code on a computer-readable medium adapted to receive and translate extended grammar constructs of a computer-readable program language into basic grammar constructs of said computer-readable program language for output to a compiler of programs code written in said basic grammar constructs, said computer-readable program language being ASN.1, wherein a translation comprises reading a source file containing extended grammar constructs, performing a lookup table conversion of said source file of extended grammar constructs into a basic source file containing only basic grammar constructs, said computer-readable program code configured to implement multiple configurable levels of precompilation;
   wherein said computer-readable program code is adapted to translate said extended grammar constructs into said basic grammar constructs by using one or more lookup tables;
   wherein said compiler generates executable code implementing a function of the extended grammar constructs as complied basic grammar constructs;
   wherein said translation comprises a direct conversion from said source file to said basic source file;
   wherein said source file with extended grammar constructs is associated with basic executables;
   wherein an exemplary file with extensions is in accordance with the following

```
Test-ASN
DEFINITIONS AUTOMATIC TAGS ::=
BEGIN
    TESTOPERATION ::= CLASS
    {
        &arguments Arguments OPTIONAL
    }
    WITH SYNTAX
    {
        [ARGUMENTS        &arguments]
    }
    Arguments ::= CHOICE
    {
        argument1  INTEGER,
        argument2  INTEGER,
        argument3  INTEGER,
        argument4  INTEGER,
        argument5  INTEGER,
        argument6  INTEGER.
    }
    myTestOperation TESTOPERATION ::=
    {
        ARGUMENTS
    }
    TestOperationSet TESTOPERATION ::= {myTestOperation}
    myTest ::= SEQUENCE
    {
        arguments TESTOPERATION.&arguments({TestOperationSet})
    }
END - of Test-ASN:
``` and wherein an exemplary file without extensions is in accordance with the following

```
Test-ASN
DEFINITIONS AUTOMATIC TAGS ::=
BEGIN
      myTest ::= SEQUENCE
    {
    arguments Arguments
    }
      Arguments ::= CHOICE
      {
            argument1   INTEGER,
            argument2   INTEGER,
            argument3   INTEGER,
            argument4   INTEGER,
```

-continued

```
            argument5   INTEGER,
            argument6   INTEGER,
      }
END - of Test-ASN.
```

14. A computer-readable computer program product of claim 13, wherein said basic grammar constructs comprise X.680 grammar constructs, and wherein said extended grammar constructs comprises at least one of X.68x, grammar constructs, where x is equal to 1, 2, or 3.

\* \* \* \* \*